US011173960B2

(12) United States Patent
Tahara

(10) Patent No.: US 11,173,960 B2
(45) Date of Patent: Nov. 16, 2021

(54) VEHICLE FRONT STRUCTURE

(71) Applicant: HONDA MOTOR CO., LTD., Tokyo (JP)

(72) Inventor: Daiki Tahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 16/810,277

(22) Filed: Mar. 5, 2020

(65) Prior Publication Data

US 2020/0290680 A1 Sep. 17, 2020

(30) Foreign Application Priority Data

Mar. 11, 2019 (JP) .............................. JP2019-043333

(51) Int. Cl.
*B62D 25/04* (2006.01)
*B62D 21/15* (2006.01)
*B62D 25/08* (2006.01)

(52) U.S. Cl.
CPC .......... *B62D 25/04* (2013.01); *B62D 21/152* (2013.01); *B62D 25/08* (2013.01)

(58) Field of Classification Search
CPC ............................... B62D 25/04; B62D 25/08
USPC ..................................................... 296/193.06
See application file for complete search history.

(56) References Cited

U.S. PATENT DOCUMENTS

2017/0210425 A1* 7/2017 Sekiguchi ............ B62D 21/152
2019/0100248 A1* 4/2019 Yamagishi ............. B62D 25/02
2019/0389512 A1 12/2019 Kawatsu et al.

FOREIGN PATENT DOCUMENTS

| JP | 2000-103360 A | 4/2000 |
| JP | 2012-066631 A | 4/2012 |
| JP | 2012-116450 A | 6/2012 |
| JP | 2012-148745 A | 8/2012 |
| JP | 2014-162417 A | 9/2014 |

(Continued)

OTHER PUBLICATIONS

Office Action received in corresponding Japanese application No. 2019-043333 dated Jan. 19, 2021 with English translation (7 pages).

*Primary Examiner* — Dennis H Pedder
(74) *Attorney, Agent, or Firm* — Rankin, Hill & Clark LLP

(57) ABSTRACT

A vehicle front structure includes a left-right pair of front pillars extending in an up-down direction and a left-right pair of upper members respectively connected to the front pillars at lower portions thereof and extending in a vehicle front-rear direction. Each front pillar includes a forward front pillar and a rearward front pillar extending in the up-down direction and has a front pillar inner part and a front pillar outer part. The front pillar inner part extends from a position located rearward of the corresponding upper member toward the corresponding rearward front pillar and includes an upper joining portion joined to the front pillar outer part, a vehicle width direction extending portion extending generally inward from the upper joining portion, and an up-down direction extending portion extending generally downward from the vehicle width direction extending portion. The vehicle width direction extending portion includes a first bead portion formed thereon extending in the vehicle front-rear direction.

9 Claims, 4 Drawing Sheets

(56) References Cited

FOREIGN PATENT DOCUMENTS

| | | | |
|---|---|---|---|
| JP | 6056543 | B2 | 1/2017 |
| WO | 2018135245 | A1 | 7/2018 |

* cited by examiner

VEHICLE FRONT STRUCTURE

CROSS-REFERENCE TO RELATED APPLICATIONS

The present application claims priority under 35 U.S.C. § 119 to Japanese Patent Application No. 2019-043333, filed Mar. 11, 2019, the disclosure of which is hereby incorporated herein by reference in its entirety.

BACKGROUND OF THE INVENTION

1. Field of the Invention

The present invention relates to a vehicle front structure having a forward front pillar and a rearward front pillar located rearward of the forward front pillar.

2. Description of the Related Art

The vehicle front structure disclosed in Japanese Patent No. 6056543 includes a front pillar made up of a forward front pillar located on a forward side of the vehicle and a rearward front pillar located rearward of the forward front pillar.

This vehicle front structure further includes a cowl side member having a vehicle rearward direction end that is extended rearward and fixed to a lower end of the rearward front pillar at a first fixing point. Japanese Patent No. 6056543 states that with this structure, the vehicle front structure can transmit a collision load inputted from the vehicle front face in the event of a frontal collision to the rearward front pillar via the first fixing point.

SUMMARY OF THE INVENTION

When causing the frontal collision load to be transmitted to the rearward front pillar as in Japanese Patent No. 6056543, it is necessary to increase the rigidity and strength of the part located along the load transmission path reaching the rearward front pillar.

The present invention has been made to address the above-described need, and it is an object of the present invention to provide a vehicle front structure that can increase the rigidity and strength of a part located along a load transmission path reaching to a rearward front pillar.

To achieve the above-described object, an aspect of the present invention is a vehicle front structure of a vehicle, the vehicle front structure including: a left-right pair of front pillars respectively arranged on left and right sides of a front part of the vehicle and extending in an up-down direction, and a left-right pair of upper members respectively connected to lower portions of the left-right pair of front pillars and extending in a vehicle front-rear direction. Each of the left-right pair of front pillars includes a forward front pillar and a rearward front pillar located rearward of the forward front pillar and extending in the up-down direction. Each of the left-right pair of front pillars has a front pillar inner part on a vehicle compartment inner side and a front pillar outer part on a vehicle compartment outer side. The front pillar inner part extends from a position located rearward of the corresponding upper member toward the corresponding rearward front pillar. The front pillar inner part includes an upper joining portion joined to the front pillar outer part, a vehicle width direction extending portion that extends generally inward in a vehicle width direction from the upper joining portion, and an up-down direction extending portion that extends generally downward from the vehicle width direction extending portion. The vehicle width direction extending portion includes a first bead portion formed thereon extending in the vehicle front-rear direction.

The present invention provides a vehicle front structure that can increase the rigidity and strength of a part located along a load transmission path reaching to the rearward front pillar.

DETAILED DESCRIPTION OF THE EMBODIMENTS

Figure 1:
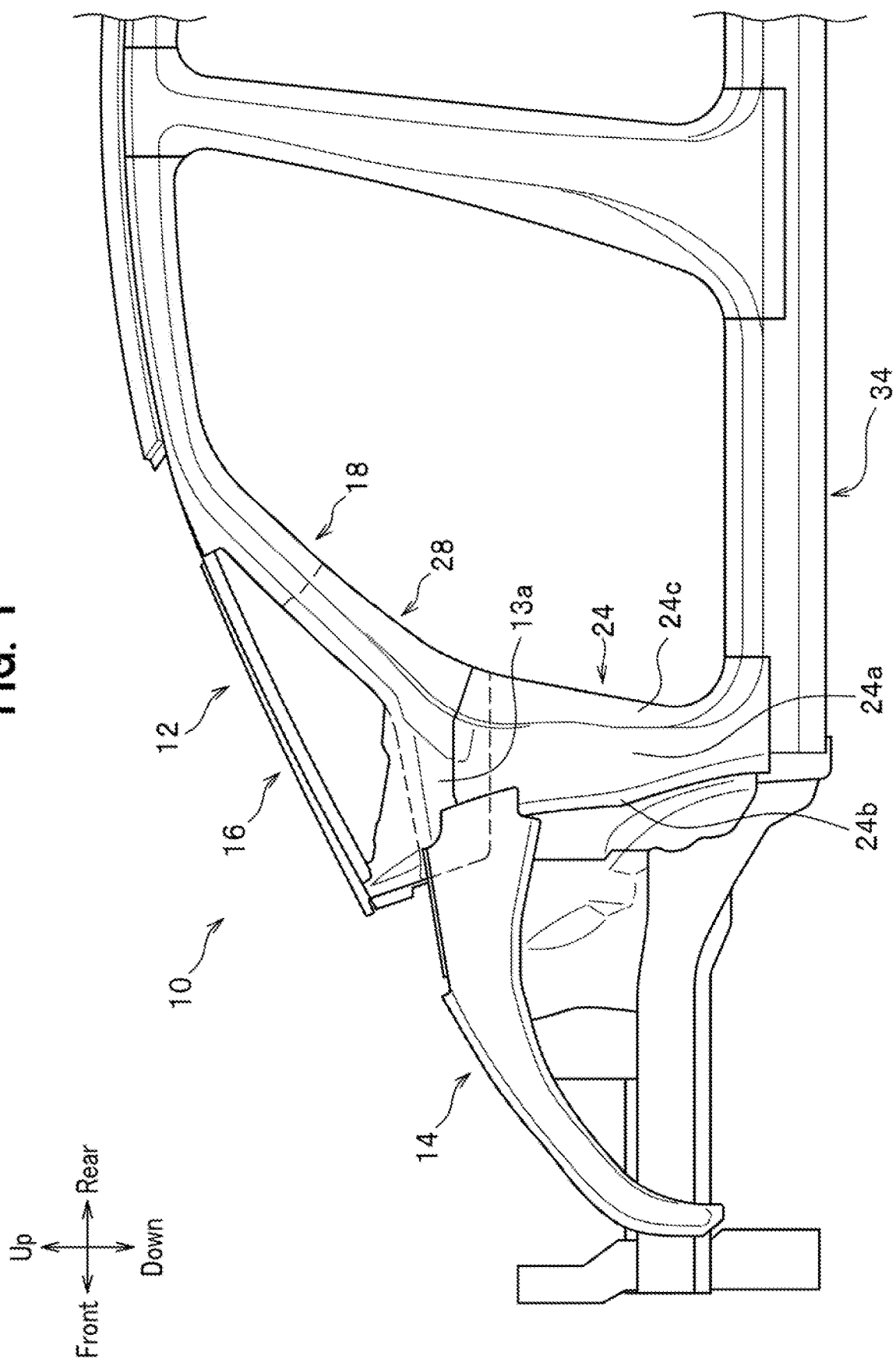
FIG. 1 is a side view of the left side of a vehicle front part to which the vehicle front structure according to an embodiment of the present invention is applied, as seen from the outside of the vehicle.

Next, a vehicle front structure of an embodiment according to the present invention will be described in detail with reference to the drawings.

In the drawings, "front-rear", "left-right", and "up-down" directions correspond to the vehicle front-rear direction, left-right direction (vehicle width direction), and vehicle up-down direction (vertically upward-downward direction), respectively.

As shown in FIG. 1, a vehicle front part 10 includes a left-right pair of front pillars 12 arranged on the left and right sides of the vehicle front part 10 and extending in the up-down direction and a left-right pair of upper members 14 respectively connected to lower portions of the left-right pair of front pillars 12 and extending in the vehicle front-rear direction. Note that only the left part of the vehicle front part 10 is illustrated in FIG. 1, and illustration of the right part of the vehicle front part 10 is omitted.

Each of the front pillars 12 has an upper part including a forward front pillar 16 and a rearward front pillar 18. The forward front pillar 16 is located forward of the rearward front pillar 18 and slopes upward as it extends from a vehicle forward side toward a vehicle rearward side. The rearward front pillar 18 is located rearward of the forward front pillar 16 and slopes upward as it extends from a vehicle forward side toward a vehicle rearward side. The rearward front pillar 18 has a larger slope angle than the forward front pillar 16.

The area of a cross-section taken along a plane perpendicular to an axis direction of the rearward front pillar 18 is larger than the area of a cross-section taken along a plane perpendicular to an axis direction of the forward front pillar 16. With this structure, the rearward front pillar 18 has a larger rigidity and strength than the forward front pillar 16.

Figure 2:
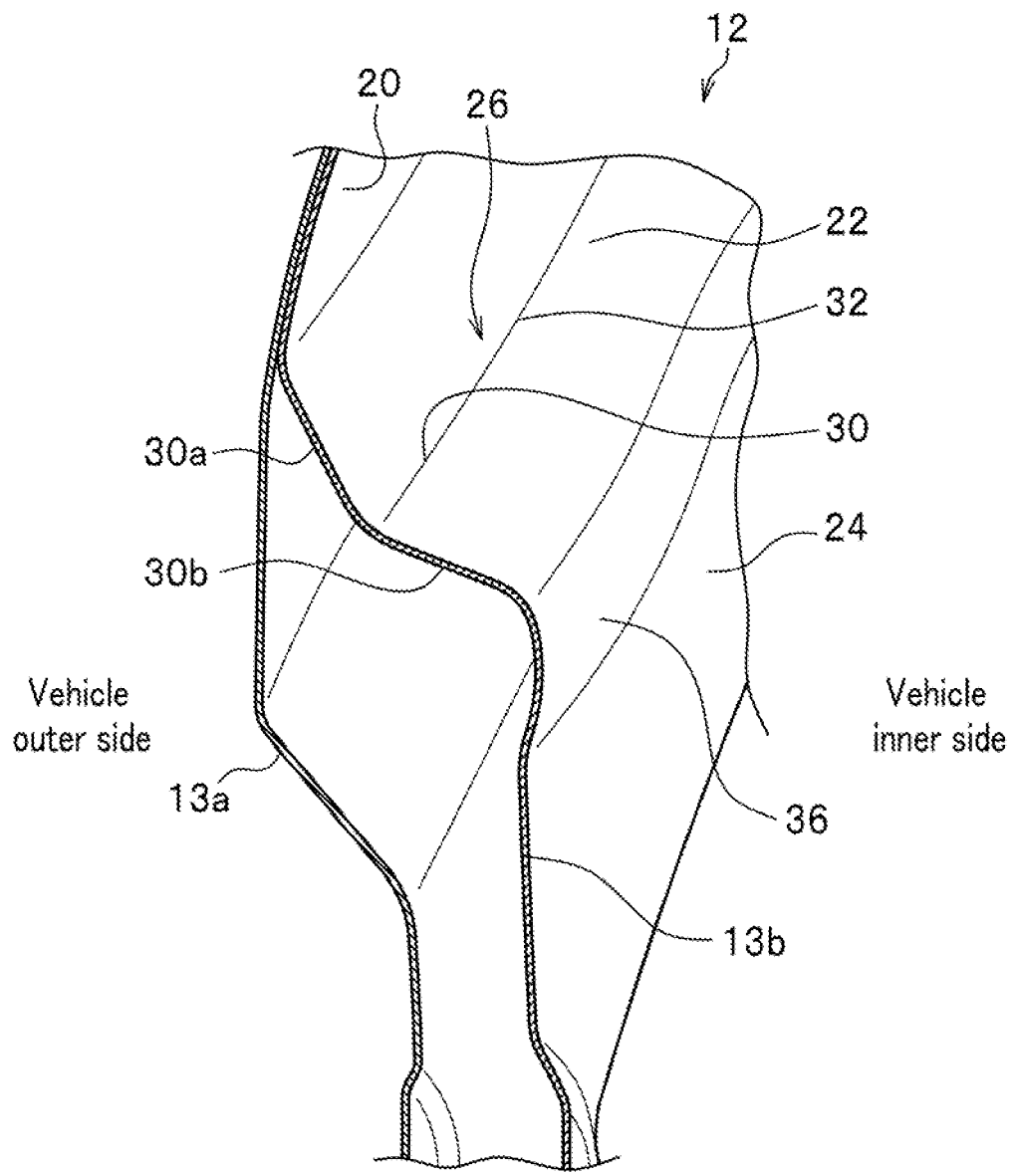
FIG. 2 is a cross-sectional view of a front pillar inner part and a front pillar outer part included in a front pillar of the vehicle front part shown in FIG. 1.

As shown in FIG. 2, each of the front pillars 12 has a lower part that is made up of a front pillar outer part 13a arranged on an outer side in the vehicle width direction and a front pillar inner part 13b arranged on an inner side in the vehicle width direction. The front pillar inner part 13b extends from a position located rearward of the corresponding upper member toward the corresponding rearward front pillar 18, on the vehicle compartment inner side. More specifically, the front pillar inner part 13b extends from a position located rearward of the corresponding upper member 14 to the corresponding rearward front pillar 18, on the vehicle compartment inner side (see FIG. 3).

As shown in FIG. 2, the front pillar inner part 13b includes an upper joining portion 20 joined to the front pillar outer part 13a on the vehicle compartment outer side, a vehicle width direction extending portion 22 extending generally inward in the vehicle width direction from the upper joining portion 20, and an up-down direction extending portion 24 extending generally downward from the vehicle width direction extending portion 22. The vehicle width direction extending portion 22 has a face extending in the vehicle width direction and includes a first bead portion 26 formed thereon extending in the vehicle front-rear direction and located at a middle portion of the face. The front pillar inner part 13b includes a curved portion 28 (see FIG. 3) that curves to extend obliquely upward from a position located rearward of the corresponding upper member 14 toward the rearward front pillar 18.

As shown in FIG. 2, the upper joining portion 20 is located at an upper end of the lower part of the front pillar 12. The upper joining portion 20 is an upper flange of the front pillar inner part 13b, to which upper flange an upper flange of the front pillar outer part 13a is integrally joined on the vehicle width direction outer side.

The first bead portion 26 of the vehicle width direction extending portion 22 is a recessed portion 30 having a wide V-shaped cross section and recessed downward from the upper joining portion 20. The first bead portion 26 extends a predetermined length along the vehicle front-rear direction. The recessed portion 30 includes a vehicle outer side wall portion 30a and a vehicle inner side wall portion 30b, which define a ridgeline 32 at a boundary therebetween. The first bead portion 26 is formed on the curved portion 28, which curves from a position located rearward of the upper member 14 toward the rearward front pillar 18.

The vehicle width direction extending portion 22 has a pair of interior component attachment holes 33a and 33b spaced apart by a predetermined distance in the vehicle front-rear direction. The interior component attachment hole 33a is located on the vehicle forward side of the vehicle width direction extending portion 22, and the interior component attachment hole 33b is located on the vehicle rearward side of the vehicle width direction extending portion 22. The first bead portion 26 extends a predetermined length in the vehicle front-rear direction in a region between the pair of interior component attachment holes 33a and 33b.

As shown in FIG. 2, the up-down direction extending portion 24 extends generally downward from a vehicle width direction inner end edge of the vehicle width direction extending portion 22 to a side sill 34 located at a lower position of the vehicle. The up-down direction extending portion 24 includes a planar portion 24a which is substantially flat, a forward side portion 24b which is contiguous with a vehicle forward portion of the planar portion 24a and depressed toward the vehicle inner side, and a rearward side portion 24c which is contiguous with a vehicle rearward portion of the planar portion 24a and depressed toward the vehicle inner side.

Figure 3:
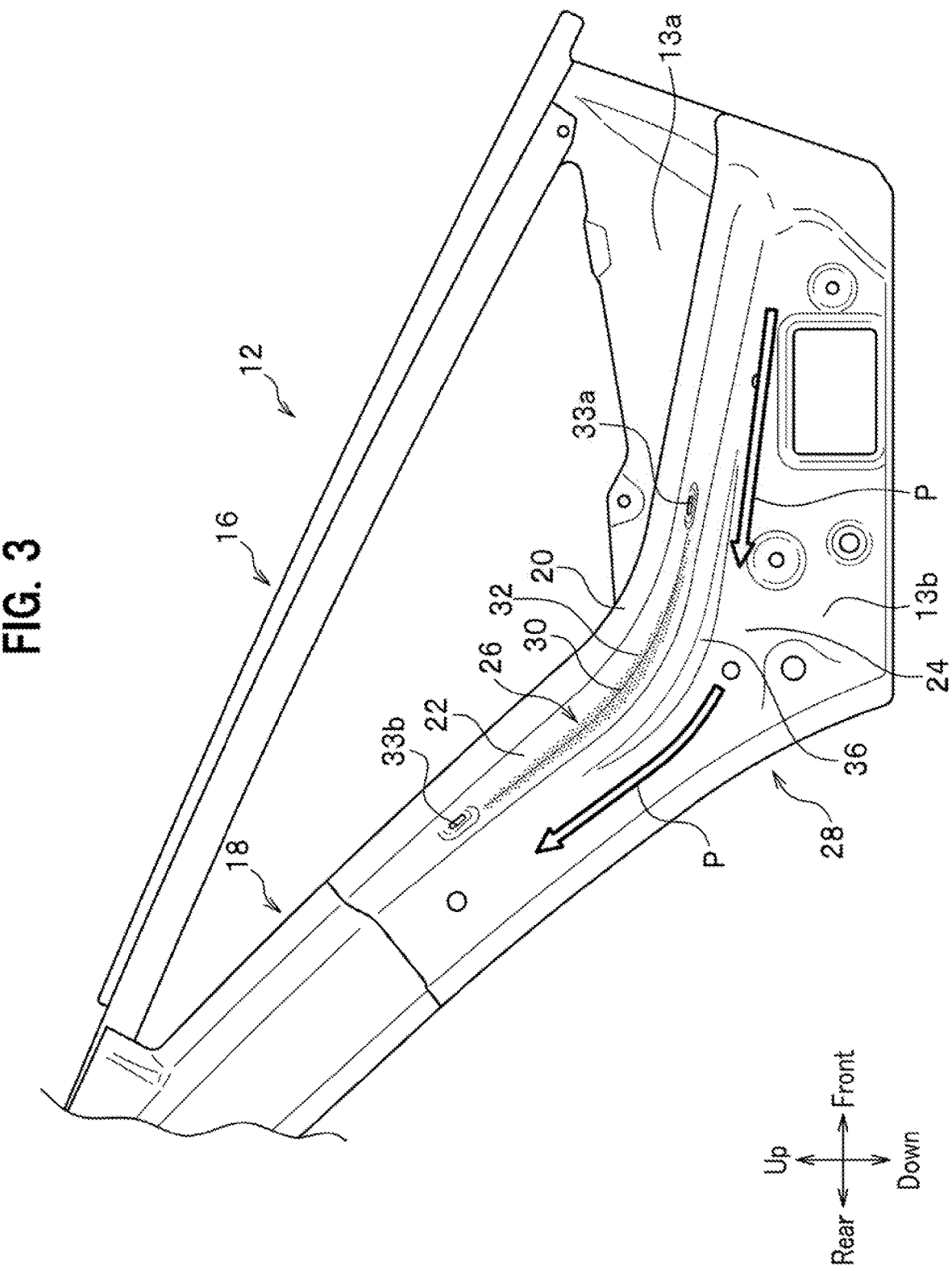
FIG. 3 is an enlarged side view of the front pillar as seen from the vehicle inner side.

As shown in FIGS. 2 and 3, the up-down direction extending portion 24 of the front pillar inner part 13b includes an upper portion on which a second bead portion 36 is formed. The second bead portion 36 is a convex portion (see FIG. 3) that protrudes from the front pillar inner part 13b toward the interior of the vehicle compartment. The second bead portion 36 curves in a substantially arc shape in side view seen from the interior of the vehicle compartment. The second bead portion 36 extends rearward in the vehicle front-rear direction from a vehicle front-rear direction intermediate portion of the up-down direction extending portion 24, toward the rearward front pillar 18.

The second bead portion 36 is located on the vehicle width direction inner side of the first bead portion 26 and is substantially in parallel with the first bead portion 26.

The vehicle front part 10, to which the vehicle front structure according to the present embodiment is applied, is basically structured as described above. Next, a description will be given of the advantageous effects of the vehicle front structure.

Figure 4B:
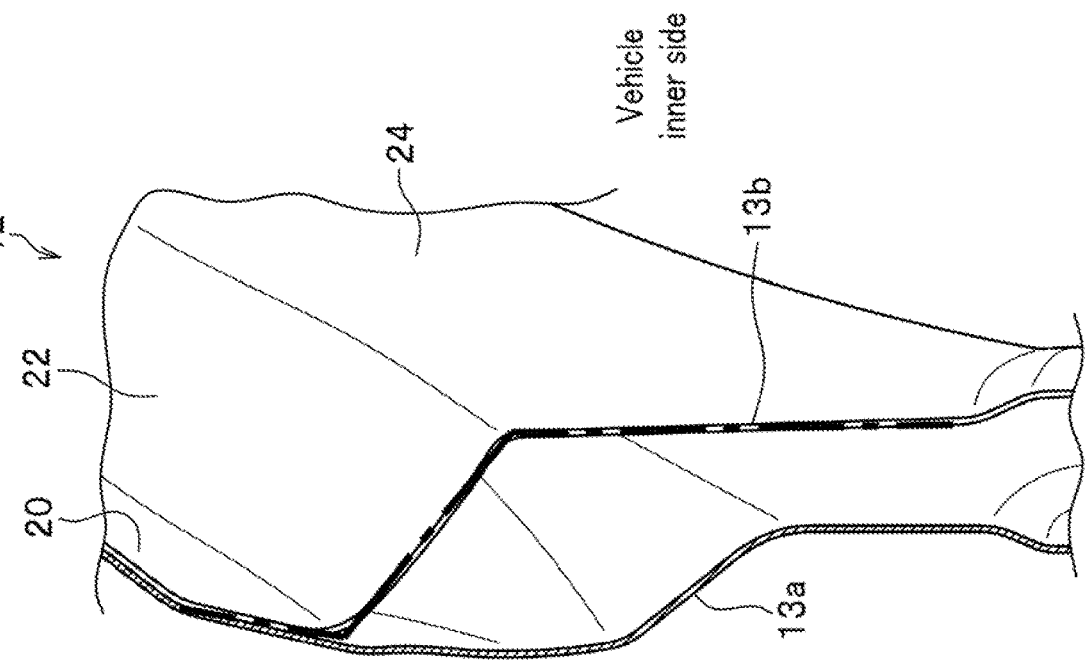
FIG. 4B is a cross-sectional view of a front pillar inner part and a front pillar outer part of a comparative example conceived of by the applicant.
Figure 4A:
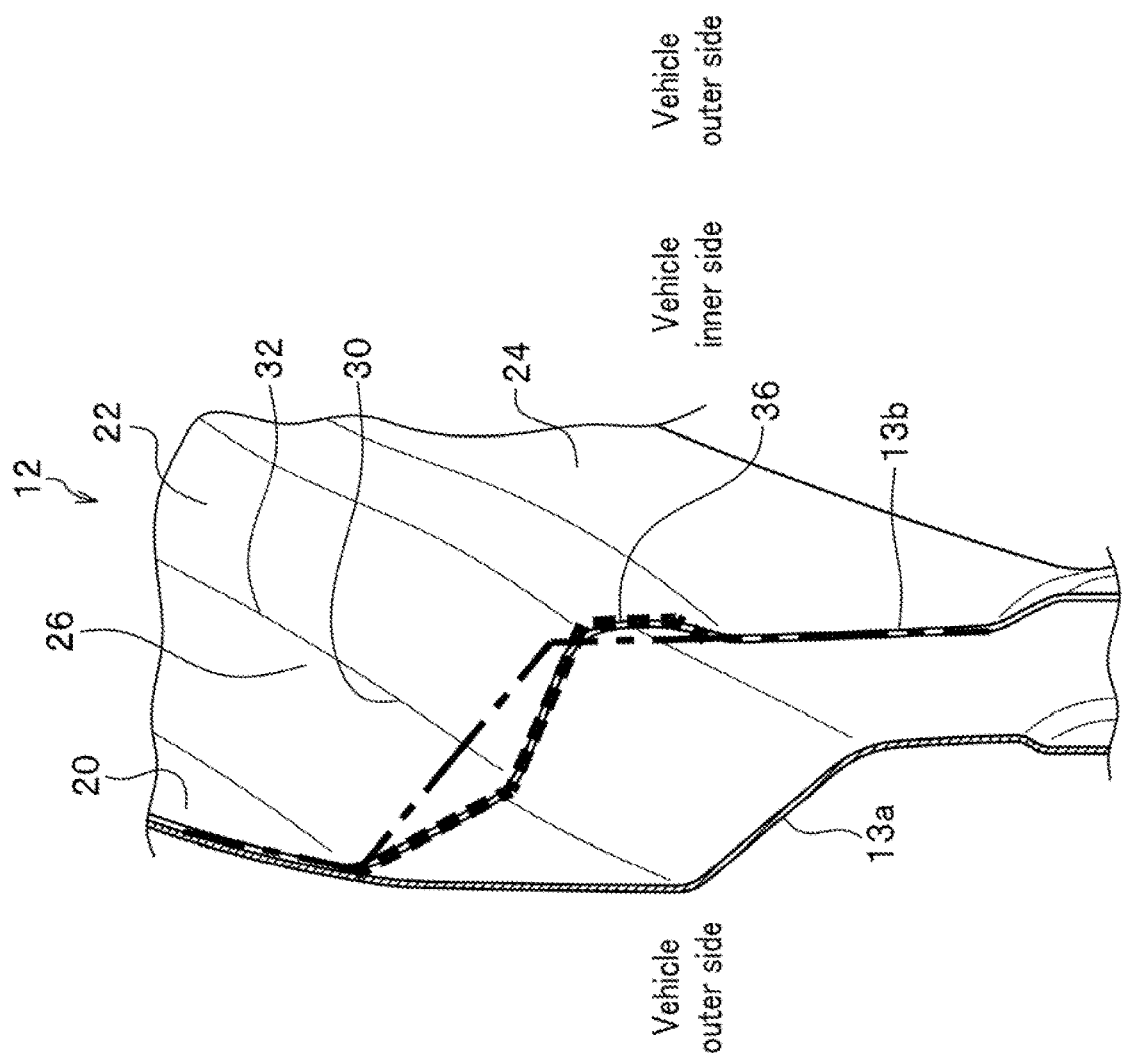
FIG. 4A is a cross-sectional view of the front pillar inner part and the front pillar outer part of the embodiment.

FIG. 4A is a cross-sectional view of the front pillar inner part and the front pillar outer part of the present embodiment. FIG. 4B is a cross sectional view of a front pillar inner part and a front pillar outer part of a comparative example conceived of by the applicant. Note that elements of the comparative example that correspond to those of the present embodiment are given the same reference numerals.

In FIGS. 4A and 4B, the bold dashed line schematically represents a cross section of the front pillar inner part 13b of the present embodiment and the bold alternate long and dash line schematically represents a cross section of the front pillar inner part 13b of the comparative example. In FIG. 4A, both the bold dashed line and the bold alternate long and dash line are shown to compare the cross section of the front pillar inner part of the present embodiment and that of the comparative example.

As shown in FIG. 4B, the vehicle width direction extending portion 22 of the comparative example is entirely planar and does not include a recessed portion corresponding to the recessed portion 30 recessed downward as in the present embodiment. In addition, the up-down direction extending portion 24 of the comparative example does not include a bead portion like the second bead portion 36 of the present embodiment at a portion where the vehicle compartment inner side end edge of the vehicle width direction extending portion 22 continues to the up-down direction extending portion 24, and has a side wall having an upper portion with a planar surface.

In contrast, as shown in FIG. 4A, the front pillar inner part 13b of the present embodiment includes an upper joining portion 20, which is, on a vehicle upper side, joined with the front pillar outer part 13a on the vehicle compartment outer side, a vehicle width direction extending portion 22 extending generally inward in the vehicle width direction from the upper joining portion 20, and an up-down direction extending portion 24 extending generally downward from the vehicle width direction extending portion 22. The vehicle width direction extending portion 22 includes the first bead portion 26, which is constituted by the recessed portion 30 recessed downward to form the ridgeline 32 and extending in the vehicle front-rear direction.

With this structure, the present embodiment increases the rigidity and strength of a portion of the front pillar inner part 13b, which portion extends from a position located rearward of the upper member 14 toward the rearward front pillar 18 (along a load transmission path P shown in FIG. 3), in comparison with the comparative example. Therefore, the present embodiment efficiently transmits a frontal collision load inputted from the upper member 14 to the rearward front pillar 18 and thus improves the load transmission efficiency of the load transmission path P (see FIG. 3), in comparison with the comparative example. As a result, the present embodiment provides a vehicle front structure that improves the rigidity and strength of the front pillar inner part 13*b* along the load transmission path P reaching the rearward front pillar 18.

The front pillar inner part 13*b* of the present embodiment includes the curved portion 28, which extends from a position located rearward of the upper member 14 toward the rearward front pillar 18. The first bead portion 26 is formed on this curved portion 28. Forming the first bead portion 26 on the curved portion 28 as in the present embodiment can suitably avoid a stress from being concentrated in the curved portion 28 when a frontal collision load is inputted.

Further, the first bead portion 26 of the present embodiment is constituted by the recessed portion 30 recessed downward. With this structure of the present embodiment, even when a not-shown interior component is attached to the front pillar inner part 13*b* via the interior component attachment holes 33*a* and 33*b*, interference of the first bead portion 26 with the interior component is suitably avoided because the first bead portion 26 is recessed downward.

Further, the up-down direction extending portion 24 of the present embodiment has an upper portion which is close to the vehicle width direction extending portion 22 and on which the second bead portion 36 projecting inward in the vehicle width direction is formed. With this structure of the present embodiment, the second bead portion 36 formed on the up-down direction extending portion 24 further improves the rigidity and strength of the front pillar inner part 13*b* together with the first bead portion 26.

What is claims is:

1. A vehicle front structure of a vehicle, the vehicle front structure comprising:
    a left-right pair of front pillars respectively arranged on left and right sides of a front part of the vehicle and extending in an up-down direction, and
    a left-right pair of upper members respectively connected to lower portions of the left-right pair of front pillars and extending in a vehicle front-rear direction,
    wherein each of the left-right pair of front pillars includes a forward front pillar and a rearward front pillar located rearward of the forward front pillar and extending in the up-down direction,
    wherein each of the left-right pair of front pillars has a front pillar inner part on a vehicle compartment inner side and a front pillar outer part on a vehicle compartment outer side,
    wherein the front pillar inner part extends from a position located rearward of the corresponding upper member toward the corresponding rearward front pillar,
    wherein the front pillar inner part includes an upper joining portion joined to the front pillar outer part at an upper portion of the vehicle, a vehicle width direction extending portion extending generally inward in a vehicle width direction from the upper joining portion, an up-down direction extending portion extending generally downward from the vehicle width direction extending portion, and a curved portion that curves to extend obliquely upward from a position located rearward of the corresponding upper member toward the corresponding rearward front pillar,
    wherein the vehicle width direction extending portion has a face extending in the vehicle width direction and includes a first bead portion formed thereon extending in the vehicle front-rear direction and located at a middle portion of the face,
    wherein the vehicle width direction extending portion extends in the vehicle width direction further inward than the first bead portion, and
    wherein the vehicle width direction extending portion, the first bead portion, and the up-down direction extending portion curve along the curved portion and extend on the front pillar inner part toward the corresponding rearward front pillar.

2. The vehicle front structure according to claim 1, wherein the first bead portion is formed on the curved portion.

3. The vehicle front structure according to claim 1, wherein the first bead portion is a recessed portion recessed downward.

4. The vehicle front structure according to claim 2, wherein the first bead portion is a recessed portion recessed downward.

5. The vehicle front structure of claim 1, wherein the up-down direction extending portion includes a second bead portion protruding inward in the vehicle width direction and extending in the vehicle front-rear direction.

6. The vehicle front structure of claim 2, wherein the up-down direction extending portion includes a second bead portion protruding inward in the vehicle width direction and extending in the vehicle front-rear direction.

7. The vehicle front structure of claim 3, wherein the up-down direction extending portion includes a second bead portion protruding inward in the vehicle width direction and extending in the vehicle front-rear direction.

8. The vehicle front structure of claim 4, wherein the up-down direction extending portion includes a second bead portion protruding inward in the vehicle width direction and extending in the vehicle front-rear direction.

9. A vehicle front structure of a vehicle, the vehicle front structure comprising:
    a left-right pair of front pillars respectively arranged on left and right sides of a front part of the vehicle and extending in an up-down direction, and
    a left-right pair of upper members respectively connected to lower portions of the left-right pair of front pillars and extending in a vehicle front-rear direction,
    wherein each of the left-right pair of front pillars includes a forward front pillar and a rearward front pillar located rearward of the forward front pillar and extending in the up-down direction,
    wherein each of the left-right pair of front pillars has a front pillar inner part on a vehicle compartment inner side and a front pillar outer part on a vehicle compartment outer side,
    wherein the front pillar inner part extends from a position located rearward of the corresponding upper member toward the corresponding rearward front pillar,
    wherein the front pillar inner part includes an upper joining portion joined to the front pillar outer part at an upper portion of the vehicle, a vehicle width direction extending portion extending generally inward in a vehicle width direction from the upper joining portion, and an up-down direction extending portion extending generally downward from the vehicle width direction extending portion,
    wherein the vehicle width direction extending portion includes a first bead portion formed thereon extending in the vehicle front-rear direction, wherein the vehicle width direction extending portion has a pair of interior component attachment holes spaced apart by a predetermined distance in the vehicle front-rear direction, and wherein the first bead portion extends a predetermined length in the vehicle front-rear direction in a region between the pair of interior component attachment holes.

* * * * *